United States Patent [19]

Sancey et al.

[11] 3,950,688

[45] Apr. 13, 1976

[54] PORTABLE AUXILIARY CURRENT SOURCE INCLUDING A BATTERY AND CHARGER

[75] Inventors: François Sancey, Bonne; Jöel Petit, Ambilly, both of France

[73] Assignee: DAV, Vetraz Monthoux Annemasse, France

[22] Filed: Feb. 6, 1975

[21] Appl. No.: 547,629

[30] Foreign Application Priority Data

Feb. 6, 1974   France .............................. 74.04001

[52] U.S. Cl. .................................... 320/2; 136/173
[51] Int. Cl.² ...................... H02J 7/00; H01M 2/10
[58] Field of Search ................................... 320/2–5; 322/1, 100; 200/61.52; 136/166, 181, 182, 171, 172, 173

[56] References Cited
UNITED STATES PATENTS

| | | | |
|---|---|---|---|
| 2,626,972 | 1/1953 | Marquardt | 320/2 X |
| 2,978,596 | 4/1961 | Robirds | 320/2 X |

FOREIGN PATENTS OR APPLICATIONS 630,489   11/1961   Canada .................................. 320/2

*Primary Examiner*—J. D. Miller
*Assistant Examiner*—Robert J. Hickey
*Attorney, Agent, or Firm*—Young & Thompson

[57] ABSTRACT

A portable auxiliary current source characterized by an overall configuration such that it is stable only in two positions, one of which is the desired operative position and the other of which is a position in which the source controls are inaccessible so that the source cannot be operated. The casing is prismatic in shape, characterized by a plurality of obtusely angled edges. In cross section, it is hexagonal with the base and the top wider than the other surfaces; and the center of gravity is very near the base so that the casing tends to tip toward one of those two positions but prefers the operative position. The casing rests in a cradle that provides handles for moving the source and that is also shaped so as to tip the source toward one of those two positions.

9 Claims, 3 Drawing Figures

PORTABLE AUXILIARY CURRENT SOURCE INCLUDING A BATTERY AND CHARGER

In all vehicles or stationary installations having electric starters, the batteries or accumulators that power the starter may fail to function, or may not function normally, either because they have lost their charge or are too old or because of external conditions. This is particularly frequent in the case of automotive vehicles and combustion motors in winter, but may happen to all fixed or portable devices having electric starters, such as tractors, aircraft, helicopters, boats, etc.

In practice, when the energy source of such an installation malfunctions, it is possible to service the same by using a group of batteries which must be positioned so as to power the starter.

Ordinarily, garages and service stations have trucks with batteries that are always available for charging, that they can rapidly bring to the place where service is needed. However, this arrangement has considerable disadvantages, as follows:

The batteries that are used are heavy.

The batteries provided for normal operation, such as starting followed by a period of slow recharging, are utilized only for starting. They are frequently called upon to give an instantaneous high voltage and their life span is thus greatly reduced, even if they are given a fairly frequent quick charge.

In warmer weather, when service calls are less frequent, the batteries must be continuously maintained lest they discharge and deteriorate.

For servicing installations located underground or for servicing vehicles whose access is difficult, the truck may not be brought to the service site, and very long connections must be provided, the batteries being too heavy to be manually transported.

The present invention has for its object the provision of a portable auxiliary current source which overcomes the above difficulties by virtue of the fact that it comprises a battery or the like of high output with small volume and low weight, and an automatic charger for the same, adapted to be connected to an electric circuit and having a casing enclosing all of the elements of the source and having a shape such that when resting on a substrate, it automatically assumes, under the influence of its own weight, either the correct operative position of the source, or else another position in which the operation of the source is prevented because the controls are inaccessible.

It is also an object of the present invention to provide such a source, which will be relatively simple and inexpensive by manufacture, easy to transport and position and utilize, and rugged and durable in use.

Other objects, features and advantages of the present invention will become apparent from a consideration of the following description, taken in connection with the accompanying drawing, which illustrates schematically by way of example one embodiment of auxiliary current source according to the present invention, and in which.

Figure 1:
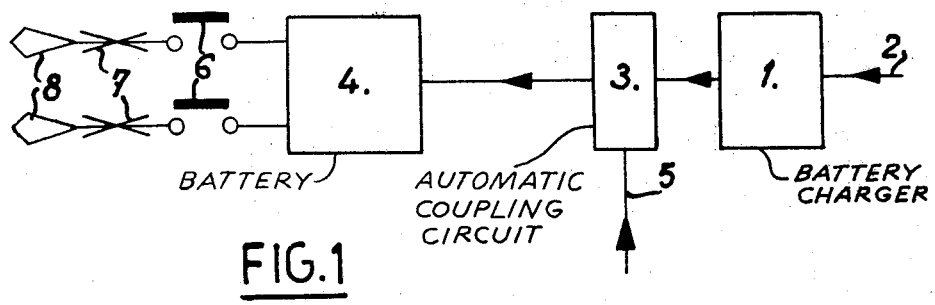
FIG. 1 is an overall circuit diagram of the components of the current source.

The portable auxiliary current source shown in the drawing comprises a double alternating automatic charger 1 which performs the following sequence of operations when it is connected to a battery to be charged.

1. A first rapid charge phase until the battery in question reaches a predetermined voltage, for example 15.1 volts. This voltage may be adjustable as the case requires.

2. The automatic changeover to a maintenance charge once this predetermined voltage is achieved.

3. The discontinuance of the charge as soon as the voltage of the battery falls below a second predetermined voltage, for example 12.6 volts. This second voltage may also be adjustable and regulated as the case requires to a desired value for a given set of circumstances.

The particular characteristics of the charger, such as its power and its two adjusted voltage levels, are determined as a function of the characteristics of the battery to be recharged.

The automatic charger has a connection cable 2 which may be connected to an electrical energy supply circuit.

The auxiliary source comprises also a circuit 3 for the automatic coupling of the charger 1 to a battery 4. The automatic coupling circuit comprises a connection cable 5 permitting connection of the source to an electrical terminal on a vehicle, for example to the cigarette lighter, to ensure recharge of the battery 4.

Finally, the battery 4 is a battery or accumulator of high output, with small volume and low weight, compared to lead batteries, and may for example be a cadmium-nickel battery of the type available on the market or a zinc battery or other such battery of this type.

This battery is of the semi-sealed type, which is to say that it may be placed in any position without the electrolyte escaping. However, this type of battery can actually operate only in a predetermined position, as will be seen hereinbelow.

In the event of overcharge, gas may escape from the battery. This type of battery may be left discharged without difficulty, for long periods of time, and needs only minimum maintenance, ordinarily an annular check of the electrolyte level.

The poles of the battery 4 are connected by means of a switch 6 to the cables 7 with their clips 8.

All this structure is assembled in or on a casing whose shape is specially devised to satisfy the following criteria:

1. It permits a single person to carry or move the source.

2. It prevents utilization of the source if it is not positioned in its service position corresponding to the operating position of the battery.

This casing has, in the illustrated embodiment, a generally prismatic form having a base 9 and an upper face 10, as well as lateral oblique faces 11, 12, 13 and 14 and end faces 15, 16, 17 and 18 which are also oblique.

The upper face of the casing has a cut-away portion which receives control guages indicating if the source is connected to the feed circuit or supply, if the charger is in rapid charge or in maintenance, and if the connectors 8 are charged.

The upper face 10 also has a plurality of winding pegs for winding up the cable 2 by which the source is connected to the supply circuit and for the cable 5 by which the source is connected to the terminal of a vehicle. Also, these members do not project beyond the plane of upper face 10 and thus cannot be damaged if the source is inverted.

The casing is mounted on a cradle 19 whose ends 20 constitute transport handles and serve for winding up the cables 7 that connect the clips 8 to the battery 4. The shape of these ends 20 is such that the device is not stable but rather tips over when placed on either end, thanks to the bars 21.

Figure 2:
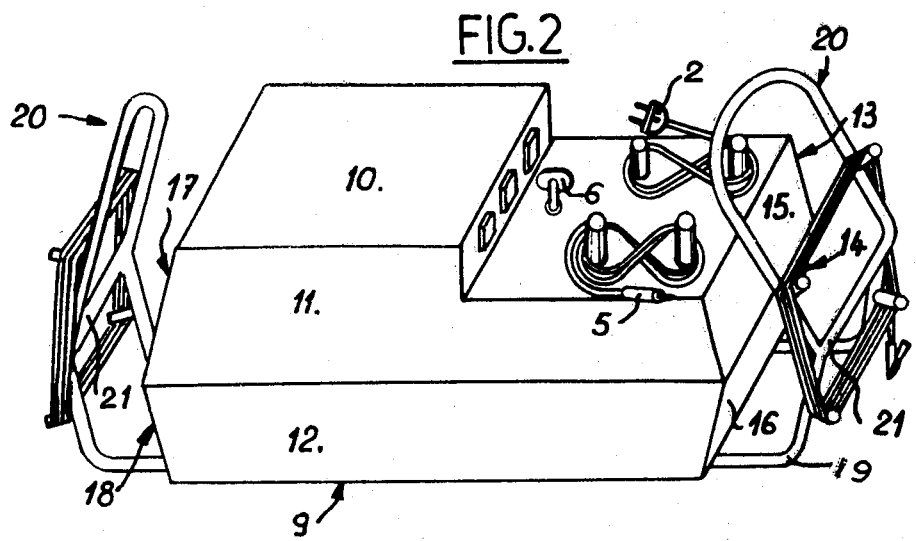
FIG. 2 is a top perspective view of the source.
Figure 3:
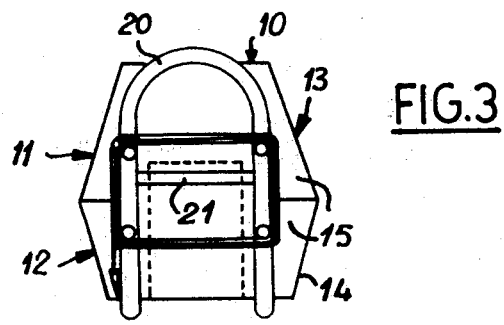
FIG. 3 is an end elevational view of the source.

All of the heavy elements, and particularly the battery, are secured in the casing near the base 9 so that, by virtue of the shape of the casing and its low center of gravity, the casing will automatically assume the service position of FIG. 2 when it is lowered to the ground in any of a plurality of positions such that it contacts the ground with any of the lateral faces 11–14.

If the user accidentally lowers the generator so that it rests on its upper face 10, the source is unusable because the switch key as well as the electrical connections of the charger are inaccessible.

The weight of the device is not more than 10 to 20 kilograms, so that it is easily transportable by a single person. The device is entirely self-contained because it is possible to recharge it in different ways:

Once the motor that has been serviced is in operation, it can be left idling several minutes leaving the clips 8 on the battery of the motor in question to recharge the auxiliary current source to the extent of the expended energy.

When the user moves from one place of use to another, the source may be connected to the cigarette lighter or another terminal of his own vehicle so as to recharge the current source battery.

Finally, when he returns from a service call, the user can connect the source to a circuit to recharge completely the source battery. The source charger being automatic, the source can remain connected indefinitely to the circuit without damage.

Thanks to these different ways of charging, it is possible to use a battery of low capacity, with resultant reduction in weight and size, while still retaining the dependable operation of the source.

If the battery is recharged from supply mains, or by connection as to the cigarette lighter, the selection of the type of charge is automatic thanks to the automatic coupling circuit 3.

In variant forms of the inventions, the casing might have different shapes so as to permit the automatic positioning of the source in its recharging position.

The cradle may be provided with rollers to facilitate transportation of the source.

According to non-illustrated variations, the shape of the casing may be different. For example, the ends of the casing may be constituted by flat faces which are vertical in the service position of the source. In that case, the shape of the handles of the cradle with the rods 21, will then be such as to prevent the source from coming to rest on one of those ends.

In another variant form, the lateral faces of the casing may also be flat and vertical in the service position of the source. But in this case lateral portions of the handles of the cradle should be so shaped as seen endwise so as to be obtusely angled. Viewed endwise, the handles would have a hexagonal shape such as to assure the correct positioning of the source by the shape of the handles alone.

In another variant, the cut-away portion of the upper surface of the casing may be closed by a cover that cannot be closed if the operating switch 6 is raised or at least in inoperative position.

The clips 8 at the ends of the cable 7 may be replaced by any other type of connector.

The embodiment which has been described is particularly well adapted for use by garages and service stations for the servicing of disabled automotive vehicles.

Other uses of the self-contained booster are however possible, particularly in the aeronautical industry. By scaling up the described apparatus, for example by using two or more batteries or accumulators, the source can be used to start aircraft motors.

In such an embodiment, it is of course to be understood that the casing enclosing the source prevents its functioning when not in service position. For higher capacity sources which are substantially heavier and larger, the same may be achieved by the fact that, by virtue of their weight they may not be placed but in a sngle position, particularly if they are mounted on a wheeled vehicle.

In this case it is not the shape of the casing that prevents the operation of the source when not in service position in which the battery or batteries are in vertical position, but rather the weight and configuration which prohibit the placement, without serious mishap, in a position other than the service position.

In such case, the output of the source, constituted by the cables 7, is terminated by a connector which effects, upon connection to the device to be powered, the automatic closing of the switch 6. The switch 6 may be replaced by a relay whose contacts are closed upon connection.

Finally, in another variant, the means preventing the operation of the source when it is not in service position, may be constituted, not by the size, shape or weight of the casing, but by a circuit breaker actuated by gravity such as a mercury switch.

From a consideration of the foregoing disclosure, therefore, it will be evident that the initially recited objects of the present invention have been achieved.

Although the present invention has been described and illustrated in connection with preferred embodiments, it is to be understood the modifications and variations may be resorted to without departing from the spirit of the invention, as those skilled in this art will readily understand. Such modifications and variations are considered to be within the purview and scope of the present invention as defined by the appended claims.

Having described our invention, we claim:

1. A portable auxiliary current source comprising at least one battery of high output and small volume and low weight, an automatic charger for the battery, means to connect the charger to a source of electrical energy, a casing enclosing the battery and the charger, a start-stop switch for the current source, and means preventing operation of the source when the source is not in a predetermined operative position, said casing having a prismatic shape characterized by a plurality of obtusely angled edges such that when it rests on a substrate it automatically assumes, under the influence of its own weight, one of only two positions, said two positions being said operative position and a position in which the current source is inaccessible for operation.

2. A current source as claimed in claim 1, in which said battery is a cadmium-nickel battery.

3. A current source as claimed in claim 1, and battery cables for connecting the source battery to a battery to be charged, said switch being in circuit between the source battery and said cables.

4. A current source as claimed in claim 3, said switch being accessible only in said operative position of the current source.

5. A current source as claimed in claim 1, and an automatic coupling circuit disposed in series between the automatic charger and the battery.

6. A generator as claimed in claim 5, and means for connecting said automatic coupling circuit to a further source of electrical energy.

7. A current source as claimed in claim 1, said casing having two opposite sides longer than the other sides.

8. A current source as claimed in claim 1, the casing having a cradle secured thereto whose ends constitute carrying handles.

9. A current source as claimed in claim 8, and means on said handles for rolling up cables by which said current source is connected to a battery to be charged.

* * * * *